Feb. 11, 1969    J. P. SWANTNER    3,427,476
SILICON CONTROL RECTIFIER GATE FIRING CIRCUIT
Filed May 11, 1966

INVENTOR.
JOHN P. SWANTNER
BY Edward M. Apple
ATTORNEY

United States Patent Office 3,427,476
Patented Feb. 11, 1969

3,427,476
SILICON CONTROL RECTIFIER GATE FIRING CIRCUIT
John P. Swantner, 25744 Eureka Road, Taylor, Mich. 48180
Filed May 11, 1966, Ser. No. 549,329
U.S. Cl. 307—252
Int. Cl. H03k 17/60
2 Claims This invention relates to electronic circuits and has particular reference to a circuit for firing the gate of a silicon control rectifier.

Devices now known to the public for gate firing of a silicon control rectifier through a substantial portion of the conductive angle of the phase, are complicated and expensive to manufacture. The cost of such devices now known to the public may run as high as $1500 and the manufacturer does not guarantee the performance because of the complicacy of such circuits.

The presently known circuits for gate firing such rectifiers usually only operate between approximately 15 degrees to 180 degrees of the conductive angle of the phase. Less expensive gate firing circuits having a firing range from approximately 90 degrees to 180 degrees of the conductive angle.

It is, therefore, an object of this invention to provide a silicon control rectifier gate firing circuit which may be assembled from parts readily obtained in the open market and at a very nominal cost, and which will function efficiently throughout the full 180 degrees of the conductive angle.

Another object of the invention is to provide a circuit of the character indicated which is very stable, and highly efficient in operation, and which provides almost perfect gate load characteristics, which is a result not obtainable by any of the circuits now known to the public.

The foregoing and other objects and advantages of the invention will become more apparent as the description proceeds, reference being made from time to time to the accompanying drawing, forming part of the within disclosure, in which drawing.

Figure 1:
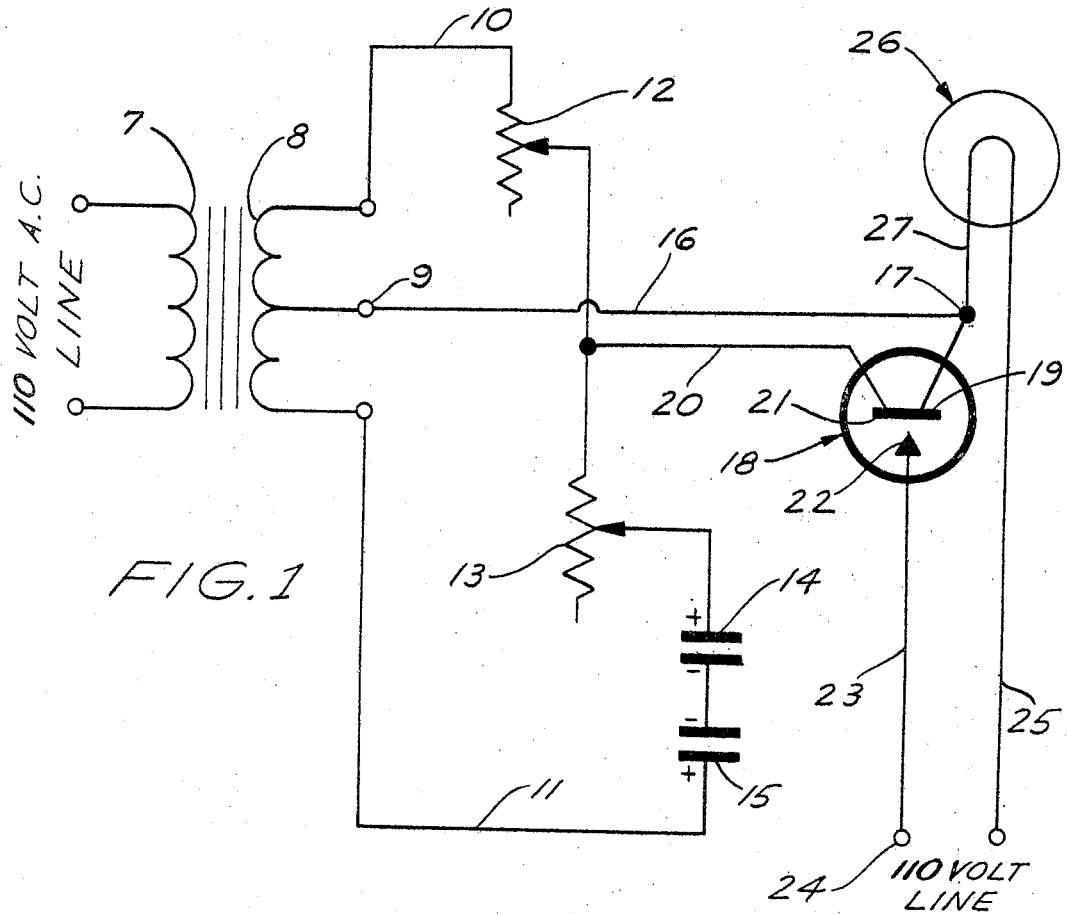
FIG. 1 is a schematic view of a device embodying the invention.

Referring now more particularly to the drawing it will be understood that in the embodiment herein disclosed the reference character 7 indicates the primary winding, and the reference character 8 indicates the secondary winding of a conventional filament transformer.

The primary winding 7 is connected to any conventional 110 volt AC line. The secondary winding 8 has an over all output of 6.3 volts and 3 amperes, and is center tapped as at 9 to provide two circuits, 10 and 11, each provided with a 3.75 voltage.

In circuit 10, I provide a 500 ohm, 5 watt, potentiometer 12, and in circuit 11 I provide a 200 ohm, 5 watt potentiometer 13, and a pair of 60 mfd. 50 volt electrolytic condensers 14 and 15, which are connected back to back.

The tapped line 16 from the secondary winding 8 is connected as at 17 to the positive side of the rectifier 18, and hence to the cathode 19 of the rectifier.

The gate line 20 connects the opposite sides of the circuits 10 and 11 to the cathode 19 as at 21. The anode 22 of the rectifier is connected through a line 23 to 110 volt line, as at 24. The opposite side 25 of the 110 volt line connects directly to a device 26, which is to be controlled, in this instance it is an incandescent lamp. The opposite side of the lamp 26 is connected through the line 27 to the cathode 19 of the rectifier.

The operation of the device is as follows: the device is arranged so that the gate of the rectifier may be fired by shifting the phase from zero to 180 degrees of the conductive angle, shown in FIG. 2.

Figure 2:
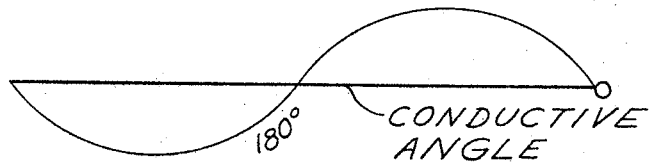
FIG. 2 is an illustration of a typical phase cycle of a 60 cycle current and showing the conductive angle as being between zero and 180 degrees.

The phase shifter in my circuit employs a 6.3 volt center tapped transformer which provides a 6.3 volt potential at 1, and which is 180 degrees out of phase with the 6.3 volts at the other end of the secondary by adjusting the potentiometers 12 and 13, the output voltage of the secondary remains constant as the phase is shifted from zero degrees to 180 degrees of the conductive angle shown in FIG. 2.

The condensers 14 and 15 positioned back to back, as shown in FIG. 1, serve to furnish additional 90 degree conduction.

With the 6.3 volt center tapped transformer hooked up to the silicon control rectifier it results in 180 degree conductive angle by the addition of the potentiometers. The phase may be shifted 90 degrees and by the addition of the two electrolytic condensers it enables me to shift the phase an additional 90 degrees so that with the device the gate of the rectifier may be fired at any place between zero and 180 degrees.

Having described my invention, what I claim and desire to secure by Letters Patent is:

1. A gate firing circuit for a silicon control rectifier comprising in combination, a transformer having a primary winding and a secondary winding, the secondary winding being tapped at the center to form two sub-circuits, the common line of said sub-circuits being connected to the cathode of said rectifier, the other line of the first of said sub-circuits having a potentiometer therein and being connected to the gate of said rectifier, the other line of the second of said sub-circuits having a potentiometer and a pair of condensers therein and being connected to the gate of said rectifier and to the other line of said first sub-circuit and a device to be controlled, one side of said last named device being connected to the cathode of said rectifier, the other side of said device being connected to a power source, the opposite side of said power source being connected to the anode of said rectifier.

2. The circuit defined in claim 1, in which the primary winding of said transformer is connected to a source of 110 volt power, and the secondary winding of said transformer develops approximately 6.3 volts and approximately 3 amperes, the said potentiometers are respectively 500 ohms, 5 watts and 200 ohms, 5 watts, and said condensers are each 60 mfd., 50 volts and are placed back to back, and said device to be controlled and said rectifier are connected to a 110 volt power source.

References Cited

UNITED STATES PATENTS 2,659,801 11/1953 Collins _____ 315—194 X
3,061,744 10/1962 Spira _____ 307—252 X ARTHUR GAUSS, *Primary Examiner.*

D. D. FORRER, *Assistant Examiner.*

U.S. Cl. X.R.

307—305; 315—194